Figure 1:
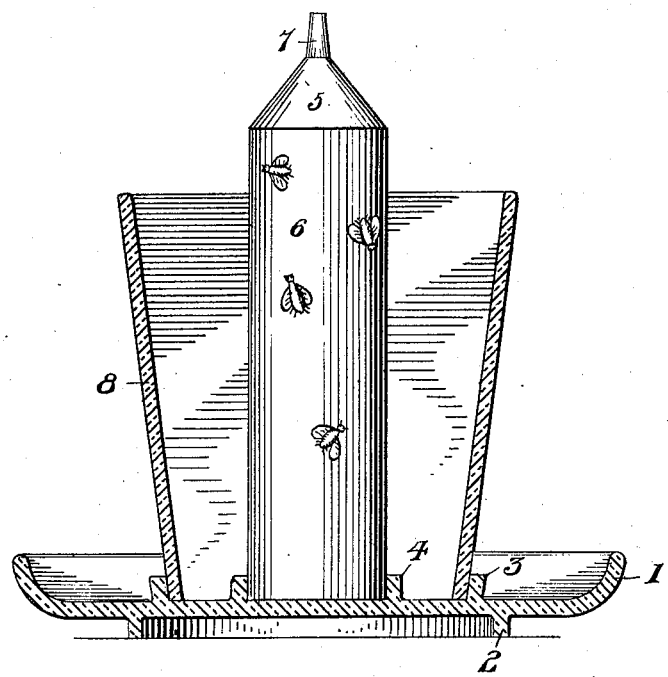

J. F. SERAFINSKI.
FLY TRAP.
APPLICATION FILED OCT. 6, 1911.

1,015,643.

Patented Jan. 23, 1912.

WITNESSES

INVENTOR
J. F. Serafinski
BY
ATTORNEYS

UNITED STATES PATENT OFFICE.

JOHN FRANK SERAFINSKI, OF PHILLIPSBURG, NEW JERSEY.

FLY-TRAP.

1,015,643.  Specification of Letters Patent.  Patented Jan. 23, 1912.

Application filed October 6, 1911. Serial No. 653,208.

*To all whom it may concern:*

Be it known that I, JOHN FRANK SERAFINSKI, a subject of the Emperor of Austria-Hungary, residing at Phillipsburg, in the county of Warren and State of New Jersey, have invented certain new and useful Improvements in Fly-Traps, of which the following is a specification, reference being had therein to the accompanying drawing.

This invention relates to a fly trap, and the object of my invention is to provide a novel receptacle for entrapping flies and other insects, the receptacle being constructed to accommodate a column that has an adhesive surface, said surface being protected by the receptacle whereby persons or objects will not contact with the column.

I attain the above object by a mechanical construction that is simple, durable and easy to maintain in a sanitary condition.

The invention will be hereinafter specifically described and then claimed, and reference will now be had to the drawing, wherein:—

Figure 2:
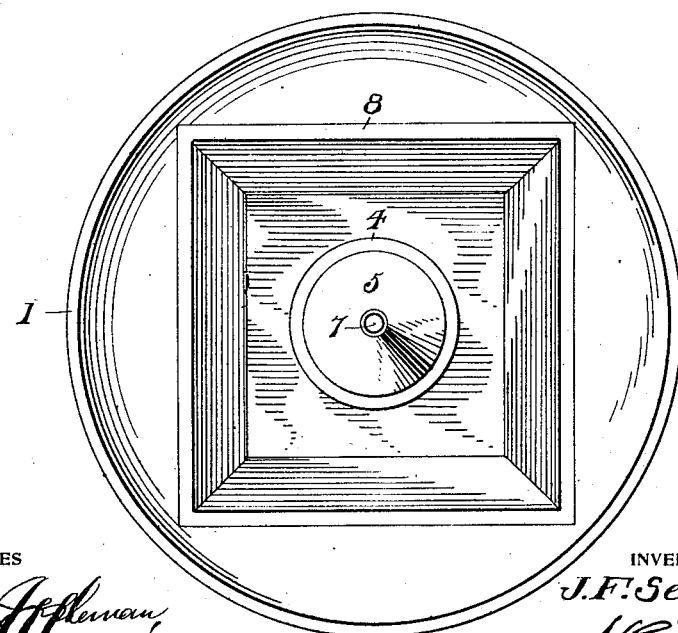

Figure 1 is a vertical sectional view of the trap, and Fig. 2 is a plan of the same.

A trap in accordance with this invention comprises a saucer or pan 1 having an annular foot 2, a rectangular flange 3 and an annular flange 4. The flanges 3 and 4 are arranged centrally of the saucer, the flange 3 being slightly inclined and the flange 4 vertical within the flange 3 concentric relatively to the peripheral edges of the saucer 1.

Mounted upon the saucer 1 and held by the vertical flange 4 is a lower end of a cylindrical column 5 covered with adhesively coated or gummed paper 6, similar to ordinary fly paper. The column 5 can be made of any suitable material and in lieu of the fly paper the surface of said column can be coated or gummed whereby flies will adhere to the same.

The upper end of the column 5 is conical and supports a suitable bait 7, as a piece of sugar, to attract flies to the column.

Resting upon the saucer 1 and supported by the flange 3 is a shell 8 that has inclined walls terminating in proximity to the upper end of the column 5, said shell being rectangular in cross section. This shell and the saucer 1 are preferably made of glass or a vitreous material, said shell preventing a person or other objects from contacting with the column 5.

With the shell made of transparent glass the flies upon the column 5 will attract other flies.

A suitable liquid can be placed in the saucer to attract insects, and as the various parts of the trap can be easily disassembled said parts can be maintained in a sanitary condition.

What I claim is:—

1. A fly trap comprising an upright saucer shaped base having a support, a pair of upright annular flanges integral with the upper face of the base and concentric with respect to each other, the outer of the flanges positioned inwardly of the marginal portion of the upper face of the base, a column having its lower end positioned between the inner end of said flanges and having its periphery gummed, and a vertically disposed transparent casing having its lower end positioned against the inner face of the outer of said flanges, said casing surrounding said column, said column projecting above said casing.

2. A fly trap comprising an upright saucer shaped base having a support, a pair of upright annular flanges integral with the upper face of the base and concentric with respect to each other, the outer of the flanges positioned inwardly of the marginal portion of the upper face of the base, a column having its lower end positioned between the inner end of said flanges and having its periphery gummed, and a vertically disposed transparent casing having its lower end positioned against the inner face of the outer of said flanges, said casing surrounding said column, said column projecting above said casing, the outer of said flanges flaring, and said casing flaring.

In testimony whereof I affix my signature in the presence of two witnesses.

JOHN FRANK SERAFINSKI.

Witnesses:
CHRISTINA F. HOOD,
JOSEPH DEUTSCH.

Copies of this patent may be obtained for five cents each, by addressing the "Commissioner of Patents, Washington, D. C."